US012803005B2

(12) United States Patent
Tseng et al.

(10) Patent No.: US 12,803,005 B2
(45) Date of Patent: Nov. 17, 2026

(54) REDOX FLOW BATTERY AND ELECTROLYTE THEREOF

(71) Applicant: Industrial Technology Research Institute, Hsinchu (TW)

(72) Inventors: Huan-Hsiung Tseng, Hsinchu County (TW); Chi-Chang Chen, Tainan City (TW)

(73) Assignee: Industrial Technology Research Institute, Hsinchu (TW)

( * ) Notice: Subject to any disclaimer, the term of this patent is extended or adjusted under 35 U.S.C. 154(b) by 537 days.

(21) Appl. No.: 18/466,837

(22) Filed: Sep. 14, 2023

(65) Prior Publication Data

US 2024/0097144 A1 Mar. 21, 2024

Related U.S. Application Data

(60) Provisional application No. 63/407,170, filed on Sep. 16, 2022.

(30) Foreign Application Priority Data

Dec. 23, 2022 (TW) ................................. 111149648

(51) Int. Cl.
*H01M 4/90* (2006.01)
*H01M 4/86* (2006.01)
*H01M 8/18* (2006.01)

(52) U.S. Cl.
CPC ........... *H01M 4/90* (2013.01); *H01M 4/8631* (2013.01); *H01M 8/188* (2013.01); *H01M 2004/8694* (2013.01)

(58) Field of Classification Search
CPC ...... H01M 4/90; H01M 4/8631; H01M 8/188; H01M 2004/8694; Y02E 60/50
See application file for complete search history.

(56) References Cited

U.S. PATENT DOCUMENTS

| | | | | |
|---|---|---|---|---|
| 6,562,514 | B1 | 5/2003 | Kazacos et al. | |
| 7,078,123 | B2 | 7/2006 | Kazacos et al. | |
| 9,966,626 | B2 | 5/2018 | Hong et al. | |
| 11,309,554 | B2 | 4/2022 | Min et al. | |
| 2015/0140471 | A1* | 5/2015 | Dong | H01M 8/02 429/498 |
| 2017/0054172 | A1 | 2/2017 | Hong et al. | |
| 2019/0326619 | A1* | 10/2019 | Winter | H01M 8/04007 |
| 2022/0123343 | A1* | 4/2022 | Bhat | H01M 8/0234 |
| 2022/0285729 | A1* | 9/2022 | Bheemireddy | H01M 8/188 |

FOREIGN PATENT DOCUMENTS

| | | |
|---|---|---|
| CN | 101572319 | 1/2012 |
| CN | 104321918 | 1/2015 |
| CN | 109841885 | 6/2019 |
| CN | 106876814 | 8/2020 |
| CN | 111937203 | 11/2020 |
| TW | M461152 | 9/2013 |
| TW | I489687 | 6/2015 |

OTHER PUBLICATIONS

Nicola Poli et al., "Novel electrolyte rebalancing method for vanadium redox flow batteries", Chemical Engineering Journal, vol. 405, Feb. 1, 2021, pp. 1-13.
Yunong Zhang et al., "The benefits and limitations of electrolyte mixing in vanadium flow batteries", Applied Energy, vol. 204, Oct. 15, 2017, pp. 373-381.
Katharina Schafner et al., "Capacity balancing for vanadium redox flow batteries through continuous and dynamic electrolyte overflow", Journal of Applied Electrochemistry, vol. 51, May 13, 2021, pp. 1217-1228.
Adam H. Whitehead et al., "Investigation of a method to hinder charge imbalance in the vanadium redox flow battery", Journal of Power Sources, vol. 230, May 15, 2013, pp. 271-276.
Liming Chen et al., "Mitigating Capacity Decay by Adding Carbohydrate in the Negative Electrolyte of Vanadium Redox Flow Battery", Energies, vol. 15, No. 7, Mar. 27, 2022, pp. 1-16.
"Office Action of Taiwan Counterpart Application", issued on Dec 5, 2023, p. 1-p. 4.

* cited by examiner

*Primary Examiner* — Muhammad S Siddiquee
(74) *Attorney, Agent, or Firm* — JCIPRNET

(57) ABSTRACT

An electrolyte of a redox flow battery, including a negative electrolyte and a positive electrolyte, is provided. The negative electrolyte includes a negative active material and a negative solvent, and the positive electrolyte includes a positive active material and a positive solvent. An initial volume of the negative electrolyte is greater than an initial volume of the positive electrolyte. A redox flow battery including the electrolyte is also provided.

8 Claims, 1 Drawing Sheet

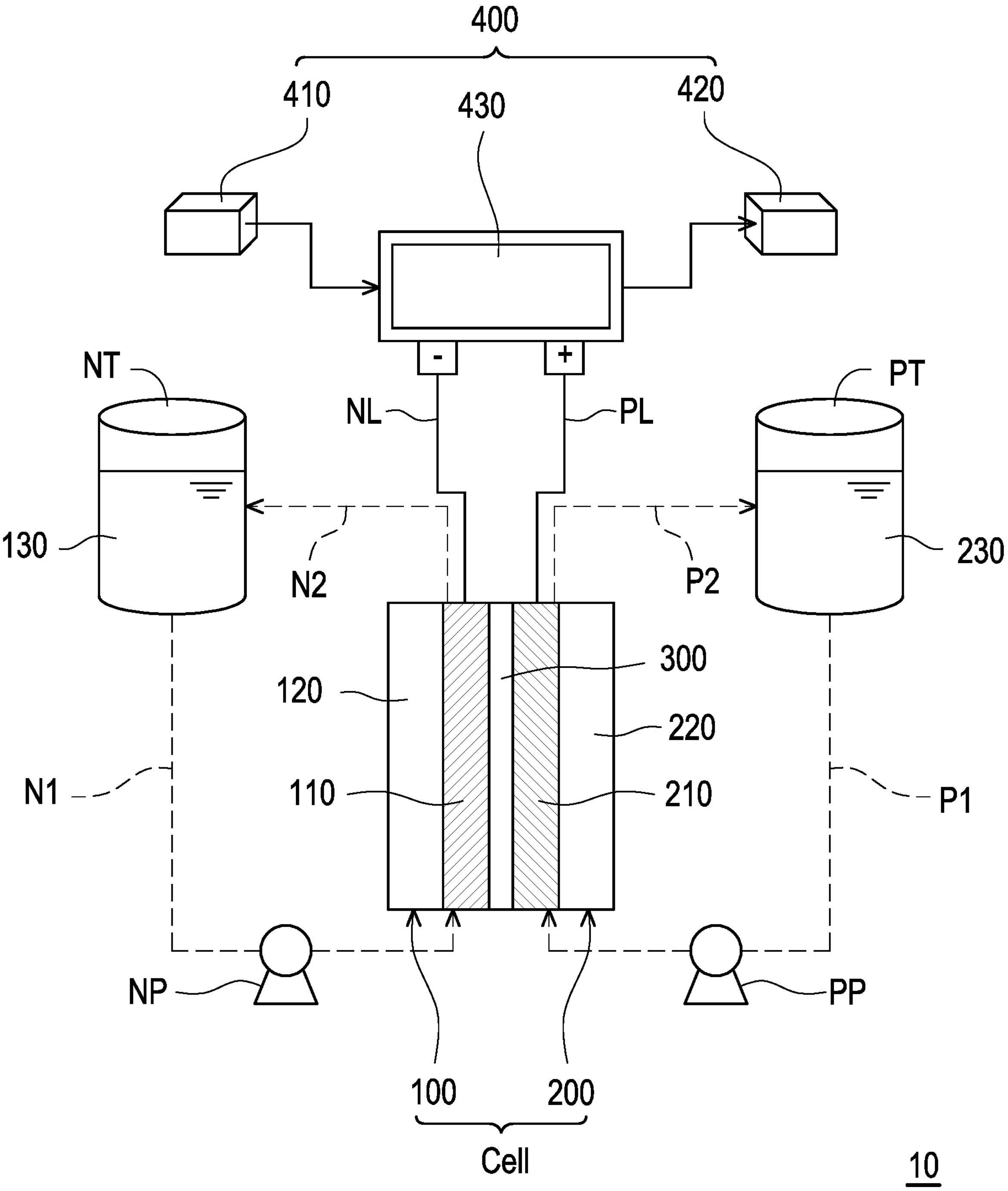
400
410
430
420
NT
PT
NL
PL
130
N2
P2
230
300
120
220
N1
110
210
P1
NP
PP
100
200
Cell
10

REDOX FLOW BATTERY AND ELECTROLYTE THEREOF

CROSS-REFERENCE TO RELATED APPLICATION

This application claims the priority benefit of U.S. provisional application Ser. No. 63/407,170, filed on Sep. 16, 2022, and Taiwan application serial no. 111149648, filed on Dec. 23, 2022. The entirety of each of the above-mentioned patent applications is hereby incorporated by reference herein and made a part of this specification.

TECHNICAL FIELD

The disclosure relates to a redox flow battery and an electrolyte thereof.

BACKGROUND

Redox flow battery is an energy storage device with great application potential, which has advantages of high safety, full charge and discharge, high energy efficiency, long battery life, less electrolyte degradation, and no harmful emissions during charge and discharge.

In the redox flow battery, an ion exchange membrane is provided between a negative compartment and a positive compartment, which is used to separate a negative active material and a negative solvent located in the negative compartment from a positive active material and a positive solvent located in the positive compartment, and allow hydrogen ions (protons) to pass through during charging and/or discharging. However, in an actual operation of the redox flow battery, there will still be a small amount of active materials and/or solvents passing through the ion exchange membrane, and after multiple charge/discharge cycles, a balance of an active material concentration, a solvent concentration and/or a solution volume, etc., between the negative compartment and the positive compartment will be destroyed, so that a total discharge capacity and/or an average energy efficiency of the redox flow battery will be reduced accordingly.

For example, when the all-vanadium redox flow battery is charged/discharged, $V^{2+}$ and $V^{3+}$ (negative active materials) located in the negative compartment may permeate through the ion exchange membrane at a higher rate than $V^{5+}$ and $V^{4+}$ (positive active materials) located in the positive compartment. In this case, after the all-vanadium redox flow battery performs multiple charge/discharge cycles, content of vanadium ions in the positive compartment may be greater than content of the vanadium ions in the negative compartment; or an electrolyte volume in the positive compartment will be greater than an electrolyte volume in the negative compartment.

Based on the above, the total discharge capacity and/or average energy efficiency of the conventional redox flow batteries will decrease due to the above factors.

SUMMARY

According to one embodiment of the disclosure, an electrolyte of a redox flow battery includes a negative electrolyte and a positive electrolyte. The negative electrolyte includes a negative active material and a negative solvent, and the positive electrolyte includes a positive active material and a positive solvent. An initial volume of the negative electrolyte is greater than an initial volume of the positive electrolyte.

According to one embodiment of the disclosure, a redox flow battery includes a negative compartment, a positive compartment and an ion exchange membrane. The negative compartment includes a negative electrode, a negative bipolar plate, and a negative electrolyte. The positive compartment includes a positive electrode, a positive bipolar plate, and a positive electrolyte. The ion exchange membrane is disposed between the negative compartment and the positive compartment. An initial volume of the negative electrolyte is greater than an initial volume of the positive electrolyte.

BRIEF DESCRIPTION OF THE DRAWINGS

FIG. is a schematic cross-sectional view of a redox flow battery according to an embodiment of the disclosure.

DETAILED DESCRIPTION OF DISCLOSURED EMBODIMENTS

The disclosure may be understood by referring to the following detailed description and in collaboration with the accompanying drawings. It should be noted that, in order to make the readers easy to understand and for the concise of the drawings, the multiple drawings in the disclosure only draw a part of an electronic device, and certain elements in the drawings are not drawn to actual scales. In addition, the number and size of each component in the figures are only for illustration, and are not intended to limit the scope of the disclosure.

Directional terminology mentioned in the following embodiments, such as "top," "bottom," "left," "right," "front," "back," etc., is used with reference to the orientation of the FIG(s) being described and are not intended to limit the disclosure. In the FIGs, each of the drawings depicts typical features of methods, structures, and/or materials used in the particular exemplary embodiments. However, these drawings are not to be interpreted as limiting or limiting the scope or property covered by these exemplary embodiments. For example, for clarity, relative thickness and position of each film layer, region and/or structure may be reduced or enlarged.

When a corresponding component (for example, a film layer or an area) referred to be "on another component", the component may be directly located on the another component, or other components probably exist there between. On the other hand, when a component is referred to be "directly on another component", none other component exits there between. Moreover, when a component is referred to be "on another component", the two components have an up-down relationship in a top view, and this component may be above or below another component, and the up-down relationship depends on an orientation of the device.

The terms "about", "equal to", "equivalent" or "identical", "substantially" or "approximately" are generally interpreted as being within a range of 20% of a given value or range, or as being within a range of 10%, 5%, 3%, 2%, 1%, or 0.5% of the given value or range.

The ordinal numbers used in the specification and claims, such as "first", "second", etc., are used to modify components, and do not imply and represent the component or these components have any previous ordinal numbers, and do not represent a sequence of one component with another, or a sequence in a manufacturing method. The use of these ordinal numbers is only to make a clear distinction between a component with a certain name and another component with the same name. The same terms may not be used in the claims and the specification, and accordingly, a first component in the specification may be a second component in the claims.

It should be noted that, in the following embodiments, the features of several different embodiments may be replaced, reorganized, and mixed to complete other embodiments without departing from the spirit of the disclosure. As long as the features of the various embodiments do not violate the spirit of the disclosure or conflict with each other, they may be mixed and matched arbitrarily.

The following examples illustrate exemplary embodiments of the disclosure, and the same reference numerals are used in the drawings and descriptions to indicate the same or similar parts.

FIG. is a schematic cross-sectional view of a redox flow battery according to an embodiment of the disclosure.

Referring to FIGURE, in some embodiments, a redox flow battery 10 may include a negative compartment 100, a negative electrolyte inflow pipe N1, a negative electrolyte outflow pipe N2, a negative electrolyte tank NT, a negative pump NP, a positive compartment 200, a positive electrolyte inflow pipe P1, a positive electrolyte outflow pipe P2, a positive electrolyte tank PT, a positive pump PP, an ion exchange membrane 300 and a power supply device 400. In some embodiments, the negative compartment 100 and the positive compartment 200 in the redox flow battery 10 may constitute a battery cell, where the battery cell may include a plurality of battery subunits (not shown) connected in series/parallel to each other to form a battery stack, but the disclosure is not limited thereto. In addition, in the embodiment, the redox flow battery 10 is an all-vanadium redox flow battery. Therefore, a redox reaction of the redox flow battery 10 during charge/discharge may be represented by, for example, a following expression:

$$VO_2^{+}+2H^{+}+V^{2+}\leftrightarrow VO^{2+}+H_2O+V^{3+}.$$

The negative compartment 100 includes, for example, a negative electrode 110, a negative bipolar plate 120, and a negative electrolyte 130.

In some embodiments, the negative electrode 110 may include a porous carbon electrode, where the porous carbon electrode has a large surface area and/or a characteristic of good circulation of the negative electrolyte 130 therein. Based on the above, a material of the negative electrode 110 may include, for example, graphite felt, carbon felt or other suitable materials, but the disclosure is not limited thereto.

In some embodiments, the negative bipolar plate 120 may include a polymer material that is resistant to acid and alkali, and the used material is not limited by the disclosure. In addition, the negative bipolar plate 120 may, for example, have a flow channel for the negative electrolyte 130 to flow, where the flow channel allows the negative electrolyte 130 to reach the negative electrode 110 relatively easily, thereby reducing an internal resistance of the negative compartment 100. In addition, the negative bipolar plate 120 may, for example, have a shape adapted to the negative electrode 110 to reduce a contact resistance between the negative bipolar plate 120 and the negative electrode 110, but the disclosure is not limited thereto.

In some embodiments, the negative electrolyte 130 may include a negative active material and a negative solvent. The negative active material may be, for example, metal ions or non-metal ions, which may participate in an oxidation reaction and a reduction reaction of the redox flow battery 10 by changing a valence number caused by losing or gaining electrons. The negative solvent may be, for example, a solvent capable of dissolving the negative active material, which may include sulfuric acid aqueous solution, nitric acid aqueous solution, hydrochloric acid aqueous solution or a combination thereof. In the embodiment, since the redox flow battery 10 is an all-vanadium redox flow battery, the negative active material in the negative electrolyte 130 is vanadium ions, and the negative solvent in the negative electrolyte 130 is sulfuric acid aqueous solution, i.e., the negative electrolyte 130 includes a sulfuric acid aqueous solution containing vanadium ions. The negative electrolyte 130 may be formed, for example, by dissolving vanadium pentoxide in a sulfuric acid aqueous solution, but the disclosure is not limited thereto. In some embodiments, an initial concentration of vanadium ions in the negative electrolyte 130 (a concentration of vanadium ions before performing charge/discharge cycles) may be 1.0M-2.0M, such as 1.2M-1.8M, or 1.4M-1.7M, and an initial concentration of a sulfuric acid solution (a concentration of sulfate ions before performing charge/discharge cycles) may be 3.0M-5.0M, such as 3.8M-4.8M, or 4.0M-4.5M. In the case that the redox flow battery 10 is an all-vanadium redox flow battery, the vanadium ions in the negative electrolyte 130 exist as $V^{3+}$ and $V^{2+}$, where when the redox flow battery 10 is discharging, the vanadium ions in the negative electrolyte 130 mainly exist as $V^{3+}$, and when the redox flow battery 10 is charging, the vanadium ions in the negative electrolyte 130 mainly exist as $V^{2+}$. In detail, when the redox flow battery 10 is charging/discharging, a redox reaction in the negative compartment 100 may be represented by a following expression:

$$V^{2+}\leftrightarrow V^{3+}+e^{-}.$$

The negative electrolyte inflow pipe N1 and the negative electrolyte outflow pipe N2 are, for example, used to connect the negative compartment 100 with the negative electrolyte tank NT, where the negative electrolyte tank NT, for example, stores the negative electrolyte 130. Based on the above, the negative electrolyte 130 may enter the negative compartment 100 through the negative electrolyte inflow pipe N1, and may leave the negative compartment 100 through the negative electrolyte outflow pipe N2 to achieve the circulation supply of the negative electrolyte 130, where a power for the negative electrolyte 130 to enter the negative compartment 100 and leave the negative compartment 100 may, for example, come from the negative pump NP connected to the negative electrolyte inflow pipe N1.

The positive compartment 200 includes, for example, a positive electrode 210, a positive bipolar plate 220, and a positive electrolyte 230.

In some embodiments, the positive electrode 210 may also include a porous carbon electrode, where the porous carbon electrode has a large surface area and/or a characteristic of good circulation of the positive electrolyte 230 therein. Based on the above, a material of the positive electrode 210 may be the same as or similar to the material of the negative electrode 110, but the disclosure is not limited thereto.

In some embodiments, the positive bipolar plate 220 may include a polymer material that is resistant to acid and alkali, and the used material is not limited by the disclosure. In addition, the positive bipolar plate 220 may, for example, have a flow channel for the positive electrolyte 230 to flow, where the flow channel allows the positive electrolyte 230 to reach the positive electrode 210 relatively easily, thereby reducing an internal resistance of the positive compartment 200. In addition, the positive bipolar plate 220 may, for example, have a shape adapted to the positive electrode 210 to reduce a contact resistance between the positive bipolar plate 220 and the positive electrode 210. Based on the above, the material and type of the positive bipolar plate 220 may be the same as or similar to the material and type of the negative bipolar plate 120, but the disclosure is not limited thereto.

In some embodiments, the positive electrolyte 130 may include a positive active material and a positive solvent. The positive active material may be, for example, metal ions or non-metal ions, which may participate in an oxidation reaction and a reduction reaction of the redox flow battery 10 by changing a valence number caused by losing or gaining electrons. The positive solvent may be, for example, a solvent capable of dissolving the positive active material, which may include sulfuric acid aqueous solution, nitric acid aqueous solution, hydrochloric acid aqueous solution or a combination thereof. In the embodiment, since the redox flow battery 10 is an all-vanadium redox flow battery, the positive active material in the positive electrolyte 130 is vanadium ions, and the positive solvent in the positive electrolyte 130 is sulfuric acid aqueous solution, i.e., the positive electrolyte 130 includes a sulfuric acid aqueous solution containing vanadium ions. The positive electrolyte 130 may be formed, for example, by dissolving vanadium pentoxide in a sulfuric acid aqueous solution, but the disclosure is not limited thereto. In the case that the redox flow battery 10 is an all-vanadium redox flow battery, the vanadium ions in the positive electrolyte 130 exist as $VO_2^+$ and $VO_2^+$, where when the redox flow battery 10 is discharging, the vanadium ions in the positive electrolyte 130 mainly exist as $VO^{2+}$, and when the redox flow battery 10 is charging, the vanadium ions in the positive electrolyte 130 mainly exist as $VO_2^+$. In detail, when the redox flow battery 10 is charging/discharging, a redox reaction in the positive compartment 200 may be represented by a following expression:

$$VO_2^+ + 2H^+ + e^- \leftrightarrow VO^{2+} + H_2O$$

In the embodiment, an initial volume of the negative electrolyte 130 (a volume of the negative electrolyte before performing charge/discharge cycles) is greater than an initial volume of the positive electrolyte 230 (a volume of the positive electrolyte before performing charge/discharge cycles). In detail, when the redox flow battery 10 has not undergone charge/discharge cycles, the volume of the negative electrolyte 130 is greater than the volume of the positive electrolyte 230. In some embodiments, a ratio of the initial volume of the negative electrolyte 130 to the initial volume of the positive electrolyte 230 is greater than 1 and less than or equal to 1.2. Based on above, in the embodiment, by making the initial volume of the negative electrolyte 130 larger than the initial volume of the positive electrolyte 230, the impact of decrease in the volume of the electrolyte in the negative compartment due to the water dragging phenomenon after a period of charge and discharge cycles of the flow battery may be slowed down, which may also reduce the effect of reducing the volume of the electrolyte in the negative compartment due to a higher permeation rate of the negative active material ($V^{2+}$ and $V^{3+}$) into the ion exchange membrane 300 compared to the permeation rate of the positive active material ($V^{5+}$ and $V^{4+}$) into the ion exchange membrane, so that a discharge capacity and/or energy efficiency (EE) of the redox flow battery 10 may be improved accordingly.

In the embodiment, an initial vanadium ion concentration in the positive electrolyte 230 may be 1.0M-2.0M, for example 1.3M-1.8M, and for example 1.5M-1.7M, and an initial concentration of the sulfuric acid solution may be 3.0M-5.5M, for example 3.8M-5.0M, and for example 4.0M-4.8M. In some embodiments, a ratio of the initial vanadium ion concentration of the negative electrolyte 130 to the initial vanadium ion concentration of the positive electrolyte 230 is greater than or equal to 0.9 and less than or equal to 1.8, and a ratio of an initial sulfate ion concentration of the negative electrolyte 130 to an initial sulfate ion concentration of the positive electrolyte 230 is greater than or equal to 0.7 and less than or equal to 1, but the disclosure is not limited thereto. In other embodiments, the initial vanadium ion concentration of the negative electrolyte 130 is greater than the initial vanadium ion concentration of the positive electrolyte 230, where the ratio of the initial vanadium ion concentration of the negative electrolyte 130 to the initial vanadium ion concentration of the positive electrolyte 230 is greater than 1 and less than or equal to 1.8. In some other embodiments, the initial sulfate ion concentration of the negative electrolyte 130 is less than the initial sulfate ion concentration of the positive electrolyte 230, where the ratio of the initial sulfate ion concentration of the negative electrolyte 130 to the initial sulfate ion concentration of the positive electrolyte 230 is greater than or equal to 0.7 and less than 1. In the embodiment, by making the initial vanadium ion concentration and/or initial sulfate ion concentration in the negative electrolyte 130 and the positive electrolyte 230 to have the above-mentioned relationship, the influence of imbalance of the active material concentration and/or electrolyte volume during the charge/discharge process of the redox flow battery 10 may be reduced, so that the discharge capacity and energy efficiency of the redox flow battery 10 may be improved accordingly.

The positive electrolyte inflow pipe P1 and the positive electrolyte outflow pipe P2 are, for example, used to connect the positive compartment 200 and the positive electrolyte tank PT, where the positive electrolyte tank PT, for example, stores the positive electrolyte 230. Based on the above, the positive electrolyte 230 may enter the positive compartment 200 through the positive electrolyte inflow pipe P1, and may leave the positive compartment 200 through the positive electrolyte outflow pipe P2, so as to achieve the circulation supply of the positive electrolyte 230, where a power for the positive electrolyte 230 to enter the positive compartment 200 and leave the positive compartment 200 may, for example, come from the positive pump PP connected to the positive electrolyte inflow pipe P1.

The ion exchange membrane 300 is, for example, disposed between the negative compartment 100 and the positive compartment 200, which may be used to suppress conduction of the active material and the solvent between the negative compartment 100 and the positive compartment 200 without hindering permeation of protons serving as charge carriers, and is not corroded by the negative electrolyte 130 and the positive electrolyte 230. In some embodiments, the ion exchange membrane 300 may include a polymer material, which may include hydrocarbon-based polymers, fluorine-containing polymers, or other suitable polymers or combinations thereof. For example, the ion exchange membrane 300 may be a hydrocarbon-based polymer with sulfonic acid groups, a perfluorocarbon with sulfonic acid groups or other suitable materials, but the disclosure is not limited thereto.

The power supply device 400 is, for example, electrically connected to a battery cell Cell formed by the negative compartment 100 and the positive compartment 200. In the embodiment, the power supply device 400 may be electrically connected to the negative compartment 100 and the positive compartment 200 through a negative power line NL and a positive power line PL respectively, but the disclosure is not limited thereto. In the embodiment, the power supply device 400 may include a power supply source 410, a power supply object 420 and a power conversion unit 430. The power supply source 410 may be, for example, used to provide power to charge the battery cell Cell, and the power supply object 420 may be, for example, used to receive power generated by discharging the battery cell Cell. The power conversion unit 430 may include, for example, a DC-to-AC converter, an AC-to-DC converter, or a DC-to-DC converter, for converting power from the power supply source 410 and/or the battery cell Cell, but the disclosure is not limited thereto.

EXPERIMENTAL EXAMPLES

The disclosure will be described below by means of experimental examples, but these experimental examples are for illustrative purposes only, and are not intended to limit a scope of the disclosure.

The redox flow battery 10 used in the experimental examples is an all-vanadium redox flow battery, where the negative electrolyte 130 and the positive electrolyte 230 respectively include a sulfuric acid aqueous solution containing vanadium ions. Moreover, the redox flow battery 10 of the experimental example is, for example, subjected to electrical analysis through an autolab electrochemical analyzer, where a discharge current (with a unit of ampere or milliampere) and voltage of each cycle of the redox flow battery 10 may be measured, a discharge capacity (with a unit of, for example, ampere hour or milliampere hour) of each cycle of the redox flow battery 10 may be obtained by multiplying the discharge current by a time (with a unit of, for example, hour) of each cycle, coulombic efficiency of the redox flow battery 10 may be calculated according to the discharge capacity and a charge capacity (obtained through the power supply device 400) of the redox flow battery 10, and the energy efficiency of the redox flow battery 10 may be calculated through the discharge current, voltage, time and charge energy (obtained through the power supply device 400) of each cycle of the redox flow battery 10, but the disclosure is not limited thereto.

Example 1

In Example 1, an initial volume of the negative electrolyte 130 was greater than an initial volume of positive electrolyte 230, where the initial volume of negative electrolyte 130 was 44 ml, and the initial volume of the positive electrolyte 230 was 40 ml.

In the example, an initial vanadium ion concentration of the negative electrolyte 130 was equal to an initial vanadium ion concentration of the positive electrolyte 230, where the initial vanadium ion concentration of the negative electrolyte 130 and the initial vanadium ion concentration of the positive electrolyte 230 were all 1.55 mol/L. Namely, an amount of vanadium ions in the negative electrolyte 130 was 68.2 mmol, and an amount of vanadium ions in the positive electrolyte 230 was 62 mmol.

In the example, an initial sulfate ion concentration of the negative electrolyte 130 was equal to an initial sulfate ion concentration of the positive electrolyte 230, where the initial sulfate ion concentration of the negative electrolyte 130 and the initial sulfate ion concentration of the positive electrolyte 230 were all 4.45 mol/L.

In Example 1, after the redox flow battery 10 was charged/discharged by 5 cycles, the average energy efficiency of the redox flow battery 10 was calculated to be 81.11% according to the data obtained by the autolab electrochemical analyzer. It is worth mentioned that energy efficiency (EE) is the ratio of the output energy and the input energy, and average energy efficiency can be calculated from the following equations, wherein N is the number of charge-discharge cycles.

$$EE = \frac{\text{output energy}}{\text{input energy}}, \qquad \text{[Example 2]}$$

$$\text{Average energy efficiency} = \frac{1}{N}\sum_{i=1}^{N} EE_i$$

In Example 2, the initial volume of the negative electrolyte 130 was greater than the initial volume of positive electrolyte 230, where the initial volume of negative electrolyte 130 was 44 ml, and the initial volume of the positive electrolyte 230 was 40 ml.

In the embodiment, the initial vanadium ion concentration of the negative electrolyte 130 was less than the initial vanadium ion concentration of the positive electrolyte 230, where the initial vanadium ion concentration of the negative electrolyte 130 was 1.41 mol/L, and the initial vanadium ion concentration of the positive electrolyte 230 was 1.55 mol/L. Namely, the amount of vanadium ions in the negative electrolyte 130 was 62 mmol, and the amount of vanadium ions in the positive electrolyte 230 was 62 mmol.

In the example, the initial sulfate ion concentration of the negative electrolyte 130 was less than the initial sulfate ion concentration of the positive electrolyte 230, where the initial sulfate ion concentration of the negative electrolyte 130 was 4 mol/L, and the initial sulfate ion concentration of the positive electrolyte 230 was 4.45 mol/L.

In Example 2, after the redox flow battery 10 was charged/discharged by 5 cycles, the average energy efficiency of the redox flow battery 10 was calculated to be 82.87% according to the data obtained by the autolab electrochemical analyzer.

In addition, after the redox flow battery 10 was charged/discharged by 250 cycles, the total discharge capacity of the redox flow battery 10 was calculated to be 195.3 ampere hours according to the data obtained by the autolab electrochemical analyzer, and the average energy efficiency of the redox flow battery 10 was 81.0%.

Example 3

In Example 3, the initial volume of the negative electrolyte 130 was greater than the initial volume of positive electrolyte 230, where the initial volume of negative electrolyte 130 was 43 ml, and the initial volume of the positive electrolyte 230 was 37 ml.

In the example, the initial vanadium ion concentration of the negative electrolyte 130 was equal to the initial vanadium ion concentration of the positive electrolyte 230, where the initial vanadium ion concentration of the negative electrolyte 130 and the initial vanadium ion concentration of the positive electrolyte 230 were all 1.55 mol/L. Namely, the amount of vanadium ions in the negative electrolyte 130 was 66.65 mmol, and the amount of vanadium ions in the positive electrolyte 230 was 57.35 mmol.

In the example, the initial sulfate ion concentration of the negative electrolyte 130 was less than the initial sulfate ion concentration of the positive electrolyte 230, where the initial sulfate ion concentration of the negative electrolyte 130 was 4 mol/L, and the initial sulfate ion concentration of the positive electrolyte 230 was 4.45 mol/L.

In Example 3, after the redox flow battery 10 was charged/discharged by 5 cycles, the average energy efficiency of the redox flow battery 10 was calculated to be 82.55% according to the data obtained by the autolab electrochemical analyzer.

In addition, after the redox flow battery 10 was charged/discharged by 250 cycles, the total discharge capacity of the redox flow battery 10 was calculated to be 178.1 ampere hours according to the data obtained by the autolab electrochemical analyzer, and the average energy efficiency of the redox flow battery 10 was 78.9%.

Example 4

In Example 4, the initial volume of the negative electrolyte 130 was greater than the initial volume of positive electrolyte 230, where the initial volume of negative electrolyte 130 was 44 ml, and the initial volume of the positive electrolyte 230 was 40 ml.

In the example, the initial vanadium ion concentration of the negative electrolyte 130 was greater than the initial vanadium ion concentration of the positive electrolyte 230, where the initial vanadium ion concentration of the negative electrolyte 130 was 1.767 mol/L, and the initial vanadium ion concentration of the positive electrolyte 230 was 1.55 mol/L. Namely, the amount of vanadium ions in the negative electrolyte 130 was 77.748 mmol, and the amount of vanadium ions in the positive electrolyte 230 was 62 mmol.

In the example, the initial sulfate ion concentration of the negative electrolyte 130 was equal to the initial sulfate ion concentration of the positive electrolyte 230, where the initial sulfate ion concentration of the negative electrolyte 130 and the initial sulfate ion concentration of the positive electrolyte 230 were all 4.45 mol/L.

In Example 4, after the redox flow battery 10 was charged/discharged by 5 cycles, the average energy efficiency of the redox flow battery 10 was calculated to be 81.76% according to the data obtained by the autolab electrochemical analyzer.

Comparative Example 1

In Comparative example 1, the initial volume of the negative electrolyte was equal to the initial volume of the positive electrolyte, where the initial volume of the negative electrolyte was 40 ml, and the initial volume of the positive electrolyte was 40 ml.

In the comparative example, the initial vanadium ion concentration of the negative electrolyte was equal to the initial vanadium ion concentration of the positive electrolyte, where the initial vanadium ion concentration of the negative electrolyte and the initial vanadium ion concentration of the positive electrolyte were all 1.55 mol/L. Namely, the amount of vanadium ions in the negative electrolyte was 62 mmol, and the amount of vanadium ions in the positive electrolyte was also 62 mmol.

In the comparative example, the initial sulfate ion concentration of the negative electrolyte was equal to the initial sulfate ion concentration of the positive electrolyte, where the initial sulfate ion concentration of the negative electrolyte and the initial sulfate ion concentration of the positive electrolyte were all 4.45 mol/L.

In Comparative example 1, after the redox flow battery was charged/discharged by 5 cycles, the average energy efficiency of the redox flow battery was calculated to be 80.42% according to the data obtained by the autolab electrochemical analyzer.

In addition, after the redox flow battery was charged/discharged by 250 cycles, the total discharge capacity of the redox flow battery was calculated to be 153.7 ampere hours according to the data obtained by the autolab electrochemical analyzer, and the average energy efficiency of the redox flow battery was 75.5%.

The initial information of Example 1 to Example 4 and Comparative example 1 were collected in table 1 below, and the experimental data of the Example 1 to Example 4 and Comparative example 1 were collected in table 2 below.

TABLE 1

| | Ratio of initial volumes of negative electrolyte to positive electrolyte | Ratio of initial sulfate ion concentrations of negative electrolyte to positive electrolyte | Ratio of initial vanadium ion concentrations of negative electrolyte to positive electrolyte |
|---|---|---|---|
| Example 1 | 1.1:1 | 1:1 | 1:1 |
| Example 2 | 1.1:1 | 0.9:1 | 0.91:1 |
| Example 3 | 1.16:1 | 0.9:1 | 1:1 |
| Example 4 | 1.1:1 | 1:1 | 1.14:1 |
| Comparative example 1 | 1:1 | 1:1 | 1:1 |

TABLE 2

| | Average energy efficiency (%) (5 cycles) | Average Energy Efficiency (%) (250 cycles) | Energy efficiency improvement rate (%) (250 cycles) (relative to comparative example 1) | Total discharge capacity (ampere hours) (250 cycles) | Total discharge capacity improvement rate (%) (250 cycles) (relative to comparative example 1) |
|---|---|---|---|---|---|
| Example 1 | 81.11 | — | — | — | — |
| Example 2 | 82.87 | 81.0 | 7.3 | 195.3 | 27.1 |
| Example 3 | 82.55 | 78.9 | 4.5 | 178.1 | 15.9 |
| Example 4 | 81.76 | — | — | — | — |
| Comparative example 1 | 80.42 | 75.5 | — | 153.7 | — |

From table 2, it may be seen that after the redox flow battery was charged/discharged by 5 cycles, compared to the redox flow battery of Comparative example 1, the redox flow batteries of Examples 1 to 4 have better average energy efficiency. Moreover, after 250 cycles of charging/discharging of the redox flow battery, compared with the redox flow battery of Comparative example 1, the redox flow batteries of Example 2 and Example 3 have better total discharge capacity and average energy efficiency.

The above experimental results are due to the fact that the initial volume of the negative electrolyte in the redox flow battery of Example 1 to Example 4 is greater than the initial volume of the positive electrolyte. Therefore, although protons may be reduced to hydrogen during the charging process of the redox flow battery to reduce the volume of the negative electrolyte in the negative compartment; or the negative active material and the positive active material may permeate the ion exchange membrane to cause a decrease in the volume of the negative electrolyte in the negative compartment due to a rate difference thereof, by making the volume of the negative electrolyte and the volume of the positive electrolyte in the redox flow battery to be in an unbalanced state at the beginning, after subsequent multiple charge/discharge cycles, the volume of the negative electrolyte and the volume of the positive electrolyte will tend to be balanced due to the above factors, and the discharge capacity and/or energy efficiency of the redox flow battery in each cycle are gradually increased, so that the total discharge capacity and/or the average energy efficiency of the redox flow battery may be accordingly be increased.

Moreover, it may be seen from table 2 that after 5 cycles of charging/discharging the redox flow battery, compared with the redox flow battery of Example 1, the redox flow battery of Example 4 has a relatively good average energy efficiency.

The above-mentioned experimental results are due to that the initial vanadium ion concentration of the negative electrolyte in the redox flow battery of Example 4 is greater than the initial vanadium ion concentration of the positive electrolyte (relative to the redox flow battery of Example 1). Similarly, by making the initial vanadium ion concentration of the negative electrolyte and the initial vanadium ion concentration of the positive electrolyte in the redox flow battery to be in the unbalanced state at the beginning, after subsequent multiple charge/discharge cycles, the vanadium ion concentration of the negative electrolyte and the vanadium ion concentration of the positive electrolyte will tend to balance due to the above factors, and the discharge capacity and/or energy efficiency of the redox flow battery in each cycle are gradually increased, so that the total discharge capacity and/or the average energy efficiency of the redox flow battery may be accordingly be increased.

In summary, the initial volume of the negative electrolyte in the redox flow battery provided by an embodiment of the disclosure is larger than the initial volume of the positive electrolyte, which may slow down a liquid level difference between the positive and negative electrolytes caused by the water dragging phenomenon after charging and discharging of the redox flow battery for a period of time, i.e., reduce the impact caused by the decrease in the volume of the electrolyte in the negative compartment, and also reduce the effect of reducing the volume of the electrolyte in the negative compartment due to the higher rate at which the negative active material ($V^{2+}$ and $V^{3+}$) permeates the ion exchange membrane relative to the rate at which the positive active material ($V^{5+}$ and $V^{4+}$) permeates the ion exchange membrane, such that the volume of the negative electrolyte and the volume of the positive electrolyte tend to balance during the charge/discharge cycles, and the total discharge capacity and/or average energy efficiency of the redox flow battery provided by the embodiment of the disclosure may be improved accordingly.

In addition, according to another embodiment of the disclosure, the initial vanadium ion concentration of the negative electrolyte in the redox flow battery is greater than the initial vanadium ion concentration of the positive electrolyte, which may also reduce the impact caused by the higher rate at which the negative active material ($V^{2+}$ and $V^{3+}$) permeates the ion exchange membrane relative to the rate at which the positive active material ($V^{5+}$ and $V^{4+}$) permeates the ion exchange membrane, such that the vanadium ion concentration of the negative electrolyte and the vanadium ion concentration of the positive electrolyte tend to balance during the charging/discharging cycles, and the total discharge capacity and/or the average energy efficiency of the redox flow battery provided by another embodiment of the disclosure may be improved accordingly.

What is claimed is:

1. An electrolyte of a redox flow battery, comprising:
- a negative electrolyte, comprising a negative active material and a negative solvent; and
- a positive electrolyte, comprising a positive active material and a positive solvent,
- wherein an initial volume of the negative electrolyte is greater than an initial volume of the positive electrolyte,
- wherein a ratio of an initial sulfate ion concentration of the negative electrolyte to an initial sulfate ion concentration of the positive electrolyte is greater than or equal to 0.7 and less than 1.

2. The electrolyte of the redox flow battery according to claim 1, wherein a ratio of the initial volume of the negative electrolyte to the initial volume of the positive electrolyte is greater than 1 and less than or equal to 1.2.

3. The electrolyte of the redox flow battery according to claim 1, wherein the negative active material and the positive active material comprise vanadium ions, and the negative solvent and the positive solvent comprise sulfuric acid aqueous solution.

4. The electrolyte of the redox flow battery according to claim 3, wherein a ratio of an initial vanadium ion concentration of the negative electrolyte to an initial vanadium ion concentration of the positive electrolyte is greater than or equal to 0.9 and less than or equal to 1.8.

5. A redox flow battery, comprising:
- a negative compartment, comprising a negative electrode, a negative bipolar plate, and a negative electrolyte;
- a positive compartment, comprising a positive electrode, a positive bipolar plate, and a positive electrolyte; and
- an ion exchange membrane, disposed between the negative compartment and the positive compartment,
- wherein an initial volume of the negative electrolyte is greater than an initial volume of the positive electrolyte,
- wherein a ratio of an initial sulfate ion concentration of the negative electrolyte to an initial sulfate ion concentration of the positive electrolyte is greater than or equal to 0.7 and less than 1.

6. The redox flow battery according to claim 5, wherein a ratio of the initial volume of the negative electrolyte to the initial volume of the positive electrolyte is greater than 1 and less than or equal to 1.2.

7. The redox flow battery according to claim 5, wherein a negative active material and a positive active material comprise vanadium ions, and a negative solvent and a positive solvent comprise sulfuric acid aqueous solution.

8. The redox flow battery according to claim 7, wherein a ratio of an initial vanadium ion concentration of the negative electrolyte to an initial vanadium ion concentration of the positive electrolyte is greater than or equal to 0.9 and less than or equal to 1.8.

* * * * *